(12) United States Patent
Jikuya et al.

(10) Patent No.: US 8,827,465 B2
(45) Date of Patent: Sep. 9, 2014

(54) IMAGE DISPLAY APPARATUS AND MOBILE INFORMATION PROCESSING APPARATUS EQUIPPED WITH THE SAME

(75) Inventors: Nobuo Jikuya, Kumamoto (JP); Hitoshi Fujimoto, Fukuoka (JP); Ryosuke Araki, Tokyo (JP)

(73) Assignee: Panasonic Corporation, Osaka (JP)

( * ) Notice: Subject to any disclaimer, the term of this patent is extended or adjusted under 35 U.S.C. 154(b) by 335 days.

(21) Appl. No.: 13/361,012

(22) Filed: Jan. 30, 2012

(65) Prior Publication Data

US 2012/0229781 A1 Sep. 13, 2012

(30) Foreign Application Priority Data

Mar. 11, 2011 (JP) ................................. 2011-053941

(51) Int. Cl.

| | | |
|---|---|---|
| *G03B 21/14* | (2006.01) | |
| *G03B 21/22* | (2006.01) | |
| *G06F 1/16* | (2006.01) | |
| *H05K 5/00* | (2006.01) | |
| *H05K 7/00* | (2006.01) | |
| *G03B 21/20* | (2006.01) | |
| *H04N 9/31* | (2006.01) | |
| *G03B 29/00* | (2006.01) | |
| *G03B 21/30* | (2006.01) | |

(52) U.S. Cl.
CPC .......... *G06F 1/1639* (2013.01); *G03B 21/2033* (2013.01); *H04N 9/3173* (2013.01); *G03B 29/00* (2013.01); *H04N 9/3161* (2013.01); *G03B 21/145* (2013.01); *G03B 21/30* (2013.01); *G06F 1/1647* (2013.01)
USPC ...................................... 353/119; 361/679.02

(58) Field of Classification Search
CPC ..... G03B 21/134; G03B 29/00; G06F 1/1639
USPC ............. 353/119, 122, 94; 348/794; 361/600, 361/679.02, 679.04, 679.06, 679.08, 361/679.19, 679.3; 455/556.1, 566
See application file for complete search history.

(56) References Cited

U.S. PATENT DOCUMENTS

| | | | |
|---|---|---|---|
| RE42,251 E * | 3/2011 | Plut ................................. | 353/31 |
| 8,382,296 B2 | 2/2013 | Itoh et al. | |
| 8,523,370 B2 * | 9/2013 | Yang et al. ..................... | 353/119 |

(Continued)

FOREIGN PATENT DOCUMENTS

| | | |
|---|---|---|
| JP | 6-012753 | 1/1994 |
| JP | 7-295678 | 11/1995 |

(Continued)

OTHER PUBLICATIONS

Japan Office action, mail date is Jan. 30, 2014.

*Primary Examiner* — William C Dowling
*Assistant Examiner* — Ryan Howard
(74) *Attorney, Agent, or Firm* — Greenblum & Bernstein P.L.C.

(57) ABSTRACT

An image display apparatus includes an optical engine unit and a control unit, the optical engine unit being provided with a projection window guiding laser light to the exterior and the control unit rotatably supporting the optical engine unit. The optical engine unit is rotatable between a first position and a second position, the projection window being shielded within the casing of the mobile information processing apparatus in the first position and the projection window being exposed outside the casing of the mobile information processing apparatus in the second position.

6 Claims, 8 Drawing Sheets

(56) References Cited

U.S. PATENT DOCUMENTS

| | | | |
|---|---|---|---|
| 2005/0030494 A1* | 2/2005 | Kumai | 353/119 |
| 2007/0177115 A1 | 8/2007 | Yin et al. | |
| 2009/0256052 A1* | 10/2009 | Hsu et al. | 248/649 |
| 2009/0257182 A1* | 10/2009 | Yang | 361/679.27 |
| 2009/0257183 A1* | 10/2009 | Yang | 361/679.27 |
| 2011/0043766 A1 | 2/2011 | Itoh et al. | |
| 2012/0092309 A1 | 4/2012 | Jikuya et al. | |
| 2012/0092567 A1 | 4/2012 | Jikuya et al. | |

FOREIGN PATENT DOCUMENTS

| | | |
|---|---|---|
| JP | 8-328487 | 12/1996 |
| JP | 2001-184763 | 7/2001 |
| JP | 2003-024143 | 1/2003 |
| JP | 2004-326499 | 11/2004 |
| JP | 2005-055812 | 3/2005 |
| JP | 2007-316393 | 12/2007 |
| JP | 2008-191196 | 8/2008 |
| JP | 2010-211293 | 9/2010 |
| WO | 2011/021352 | 2/2011 |

* cited by examiner

Fig.2
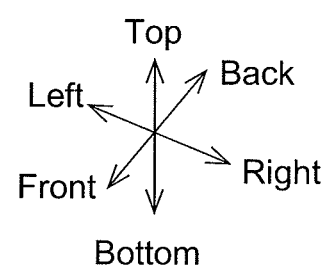
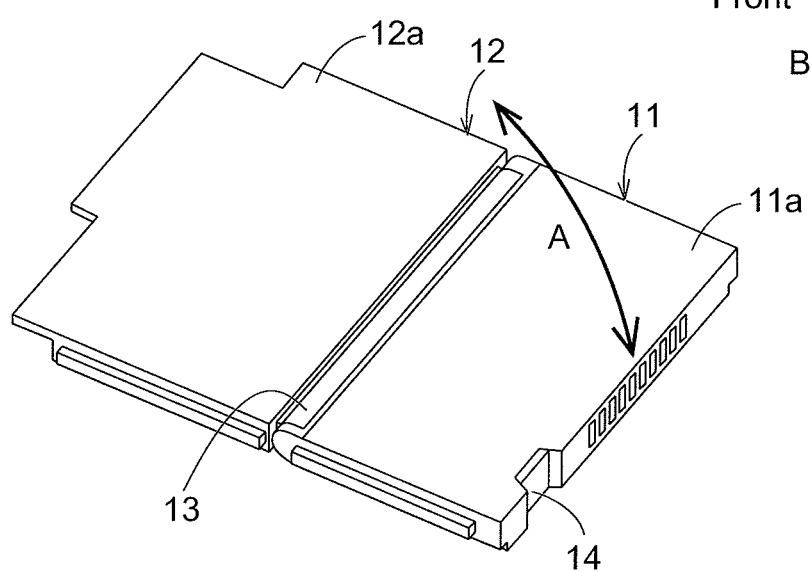

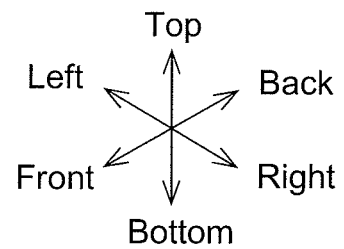
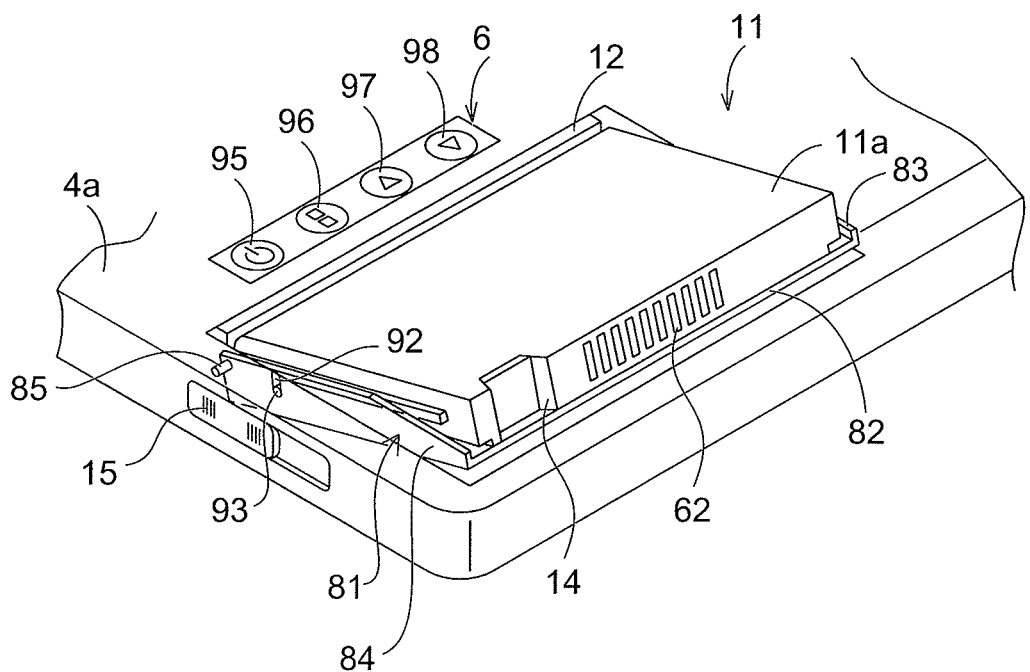
Fig.5

Fig.7
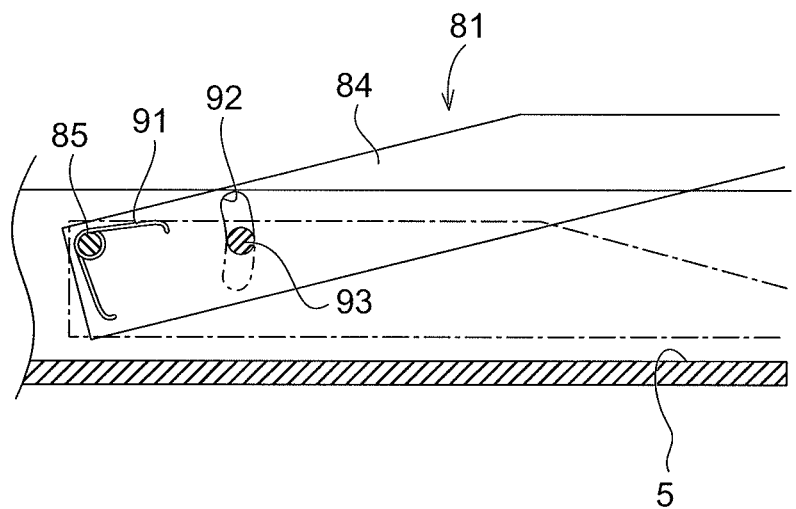
Fig.8
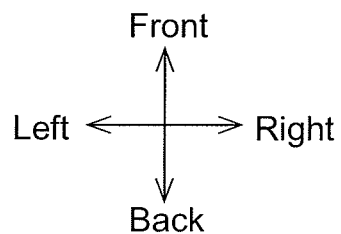
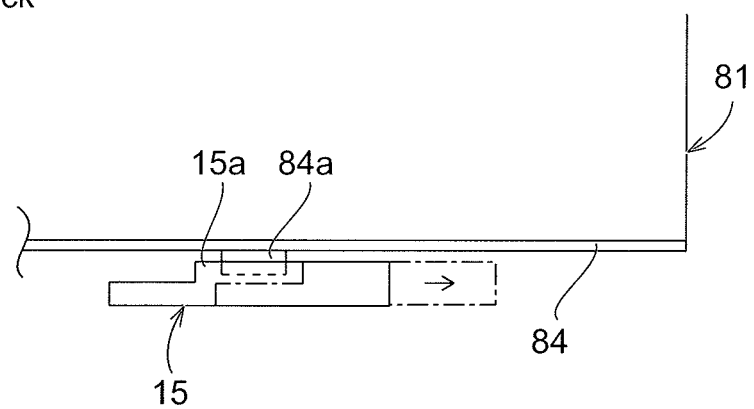

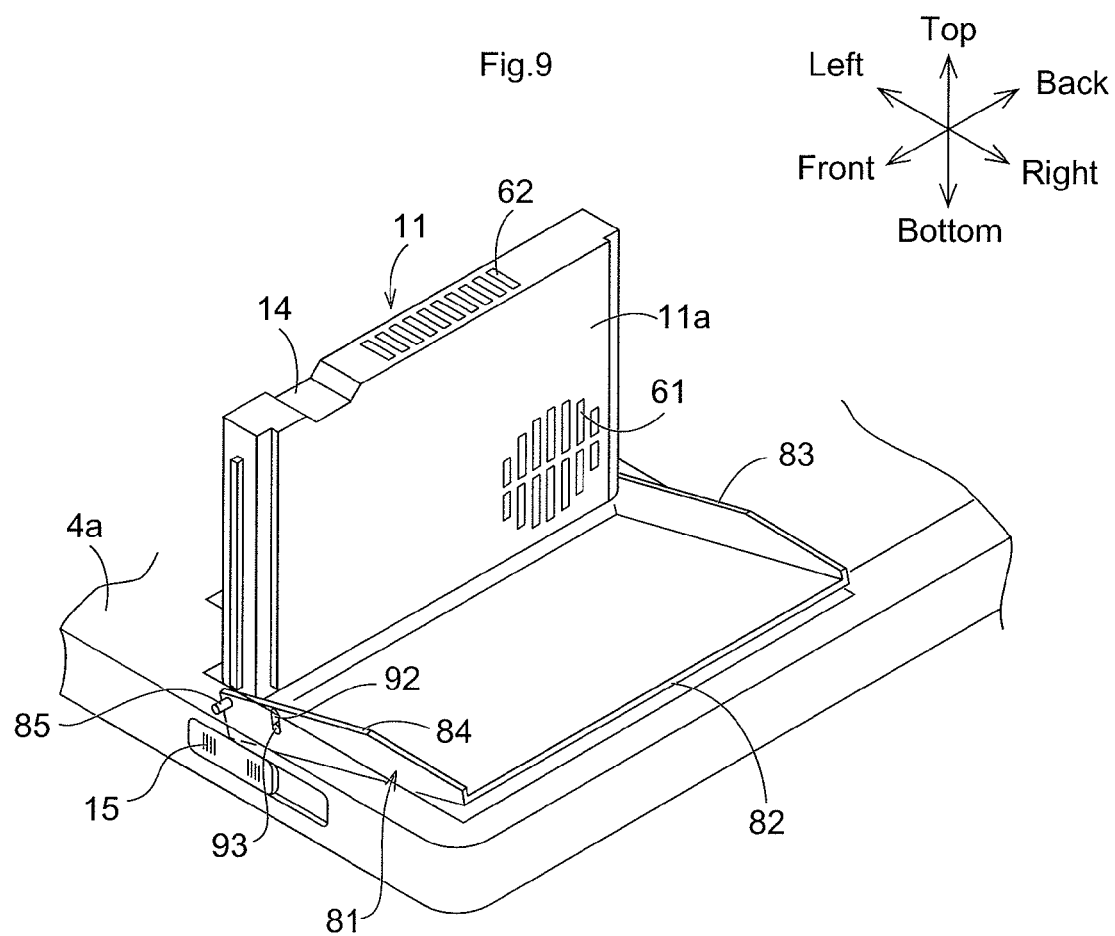

IMAGE DISPLAY APPARATUS AND MOBILE INFORMATION PROCESSING APPARATUS EQUIPPED WITH THE SAME

CROSS-REFERENCE TO RELATED APPLICATIONS

The present application claims priority under 35 U.S.C. §119 of Japanese Application No. 2011-053941, filed on Mar. 11, 2011, the disclosure of which is expressly incorporated by reference herein in its entirety.

BACKGROUND OF THE INVENTION

1. Field of the Invention

The present invention relates to an image display apparatus using a semiconductor laser as a light source and to a mobile information processing apparatus equipped with the same.

2. Description of Related Art

In recent years, attention has been on technology using a semiconductor laser as a light source for an image display apparatus. A semiconductor laser has various advantages as compared to a mercury lamp frequently used in image display apparatuses, such as good color reproduction, instantaneous lighting, long life, the ability to reduce power consumption at a high efficiency, and ease of miniaturization.

An image display apparatus using a semiconductor laser is advantageous because it is well suited to installation in a mobile information processing apparatus. For example, installation of an image display apparatus using a semiconductor laser in a mobile phone terminal is known technology (see Related Art 1).

[Related Art 1] Japanese Patent Laid-open Publication 2007-316393

SUMMARY OF THE INVENTION

In the conventional technology described in Related Art 1, an image display apparatus installed in a mobile telephone terminal includes, for example, a projection lens protruding laterally from the casing of the mobile telephone terminal and projecting light as an image onto an exterior screen. When such a protrusion exists on a mobile information processing device, however, miniaturization of the apparatus is impeded and the convenience of the apparatus (for example, ease of handling by a user) decreases.

Instead of a protruding projection lens, it is possible that a projection window or the like may be equipped on the casing of a mobile information processing apparatus. However, the projection window must be protected from adhesion of dust, damage, and the like. A projection window is also likely to be problematic due to inferiority in heat release.

The present invention has been conceived in consideration of these circumstances in the related art. The present invention has a structure allowing compact installation of an image display apparatus in a mobile information processing apparatus and has the advantages of providing a highly convenient image display apparatus and a mobile information processing apparatus equipped with the same.

The image display apparatus of the present invention is installed in a mobile information processing apparatus. The image display apparatus projects laser light emitted from a light source onto an exterior screen and includes a first unit and a second unit, the first unit being provided with a projection window guiding the laser light to the exterior and the second unit rotatably supporting the first unit. The first unit is rotatable between a first position and a second position, the projection window being shielded within the casing of the mobile information processing apparatus in the first position and the projection window being exposed outside the casing of the mobile information processing apparatus in the second position.

The present invention provides excellent advantages such as compact installation of an image display apparatus in a mobile information processing apparatus and increased convenience.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2 is a perspective view of the main portion of the image display apparatus 1.

FIG. 5 is a partial perspective view illustrating a periphery of the image display apparatus 1 in the information processing apparatus 2.

FIG. 7 is an explanatory view of the structure regulating the range of rotation of a pop-up base 81.

FIG. 8 is a schematic planar view illustrating a locking structure of the pop-up base 81 with a switch 15.

FIG. 9 is a perspective view illustrating an exemplary manual tilt adjustment of the optical engine unit 11.

DETAILED DESCRIPTION OF THE INVENTION

Figure 1A:
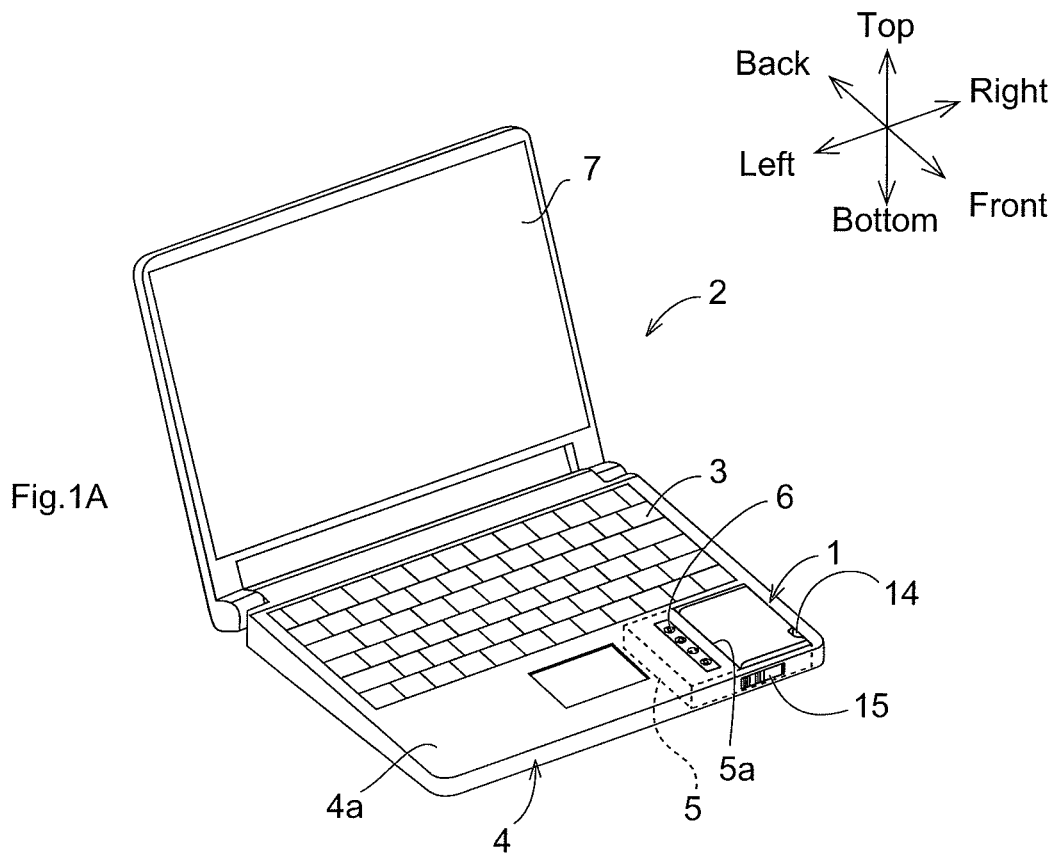
FIGS. 1A and 1B are perspective views of a mobile information processing apparatus 2 installed with an image display apparatus 1 according to the present invention (FIG. 1A illustrates a non-use state of the image display apparatus 1 and FIG. 1B illustrates a use state of the image display apparatus 1).

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the fauns of the present invention may be embodied in practice.

One aspect of the invention is an image display apparatus attempting to solve the problems described above. The image display apparatus is installed in a mobile information processing apparatus and projects a laser light emitted from a light source onto an exterior screen. The image display apparatus includes a first unit and a second unit, the first unit being provided with a projection window guiding the laser light to the exterior, and the second unit rotatably supporting the first unit. The first unit is rotatable between a first position and a second position, the projection window being shielded within the casing of the mobile information processing apparatus in the first position and the projection window being exposed outside the casing of the mobile information processing apparatus in the second position.

In this way, when the image display apparatus is not in use, the first unit may be stored within the casing so as to shield the projection window and, likewise, when the image display apparatus is in use, the projection window may be exposed and turned in a desired projection direction by rotating the first unit. The image display device thus has a structure allowing compact installation in a mobile information processing apparatus while providing an increased level of convenience.

Another aspect of the invention further includes a bias biasing the first unit toward the second position side.

Using the bias force of the bias, the first unit may thus be easily rotated toward the second position side, improving operability by the user. In such a case, when the first unit includes a lock locking the first unit in the first position, the first unit may be rotated toward the second position side by releasing the lock as necessary.

Another aspect of the invention further includes a rotation aid rotatable as a single body with the first unit only when the first unit is between the first position and the second position. The bias biases the first unit toward the second position side through the rotation aid. After the first unit has rotated toward the second position side as a single body with the rotation aid through the bias force of the bias, the first unit may be separated from the rotation aid and further rotated in the same direction.

Due to the simple structure, the first unit may be easily rotated toward the second position side using the bias force of the bias and, following rotation through the bias force, the user may rotate only the first unit by hand to turn the projection window in the desired projection direction.

Another aspect of the invention is a mobile information processing apparatus which includes the image display apparatus according to any of the first, second, and third aspects of the invention.

Another aspect of the invention includes an operation inputter and a palm rest adjacent thereto. The first unit is extractably and retractably provided in the palm rest.

Accordingly, using the palm rest in which housing space is easily reserved, the image display device has a structure allowing compact installation in the mobile information processing apparatus. At the same time, the projection direction of the laser light onto the exterior screen may be easily modified, and the level of convenience is thereby increased.

In another aspect of the invention, the mobile information processing apparatus has a structure housing the first unit and the second unit in a drive bay provided in the palm rest.

Accordingly, due to the simple structure, the image display apparatus may be compactly installed in the mobile information processing apparatus.

In another aspect of the invention, the first unit forms part of the rest surface of the palm rest.

Accordingly, due to the simple structure, the image display apparatus may be compactly installed without complicating the structure of the mobile information processing apparatus.

Another aspect of the invention further includes a display for information display. When the first unit is in the second position, the projection direction of the projection window is turned in a direction different from the display direction of the display.

Accordingly, even when the image display apparatus is provided in the palm rest, the projection direction of the laser will not be turned in the direction of the user operating the mobile information processing apparatus, thereby improving operability and safety for the user.

Hereafter, embodiments of the present invention are described with reference to the drawings. Within the description, the orientation (top and bottom, left and right, front and back) of the image display apparatus and mobile information processing apparatus obey the directions of the arrows shown in FIG. 1, as a rule.

Figure 1B:
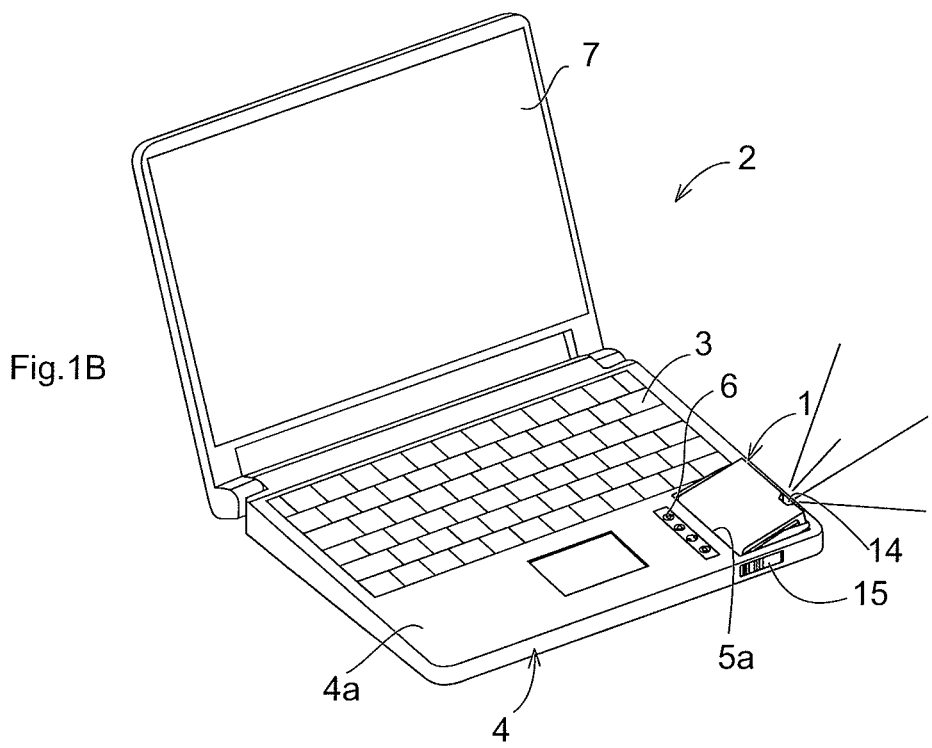

FIGS. 1A and 1B are perspective views of a mobile information processing apparatus 2 in which an image display apparatus 1 according to the present invention has been installed (FIG. 1A showing a non-use state of the image display apparatus 1 and FIG. 1B showing a use state of the image display apparatus 1). FIG. 2 is a perspective view of the main portion of the image display apparatus 1.

As shown in FIG. 1A, the information processing apparatus (herein, a notebook personal computer) 2 includes a palm rest 4 adjacent to the front of a keyboard (operation inputter) 3. The palm rest 4 includes a housing concavity 5 which has an opening on the top surface (rest surface) 4a of the palm rest 4 and which acts as a housing space for installing the image display apparatus 1. The housing concavity 5 is situated on the edge of the right side of the palm rest 4 so as to not impede operation of the keyboard 3 or similar by the user. An operator 6 for the image display apparatus 1 is provided to the left of the opening 5a. Furthermore, the information processing apparatus 2 includes an LCD (Liquid Crystal Display) 7 distinct from the image display apparatus 1 for displaying various kinds of information related to information processing.

As shown in FIG. 2, the image display apparatus 1 is primarily composed of an optical engine unit (first unit) 11 and a control unit (second unit) 12, the optical engine unit 11 having an optical element for projecting the laser light on an exterior screen, the optical element being housed in a housing 11a, and the control unit 12 having a board or the like for controlling the optical element in the optical engine unit 11, the board or the like being housed in a housing 12a. Herewith an example is shown which includes the control unit 12 as a separate body from the information processing apparatus 2. However, a structure is also possible in which a controller having similar functions to the control unit 12 is included in a single body with the information processing apparatus 2.

The optical engine unit 11 is connected via a hinge 13 to the control unit 12, which is fixed in the interior of the palm rest 4. Accordingly, as shown by an arrow A in FIG. 2, the optical engine unit 11 is rotatably supported by the control unit 12 and is freely extractable and retractable from the casing (herein, palm rest 4) of the information processing apparatus 2 through a rotating action. The optical engine unit 11 further includes a projection window 14 on the edge of the side opposite the hinge 13. Laser light is guided to the exterior from the projection window 14.

As shown in FIG. 1A, in the image display apparatus 1, the projection window 14 is shielded by the optical engine unit 11 being stored within the casing of the information processing apparatus 2 when not in use. As shown in FIG. 1B, the projection window 14 is exposed by the rotation of the optical engine unit 11 when in use. The rotating action of the optical engine unit 11 occurs based on operation of a sliding switch (lock) 15 provided on the right side of the front face of the palm rest 4.

When not in use (during storage), the top surface of the optical engine unit 11 is situated so as to have a single surface with, for example, the top surface 4a of the palm rest 4 so as to form a part of the top surface 4a. In certain situations, a cover may be provided which overlays the top surface of the optical engine unit 11 (that is, which seals the opening of the housing concavity 5) such that with the cover, the optical engine unit 11 forms a part of the top surface 4a of the palm rest 4.

Figure 3:
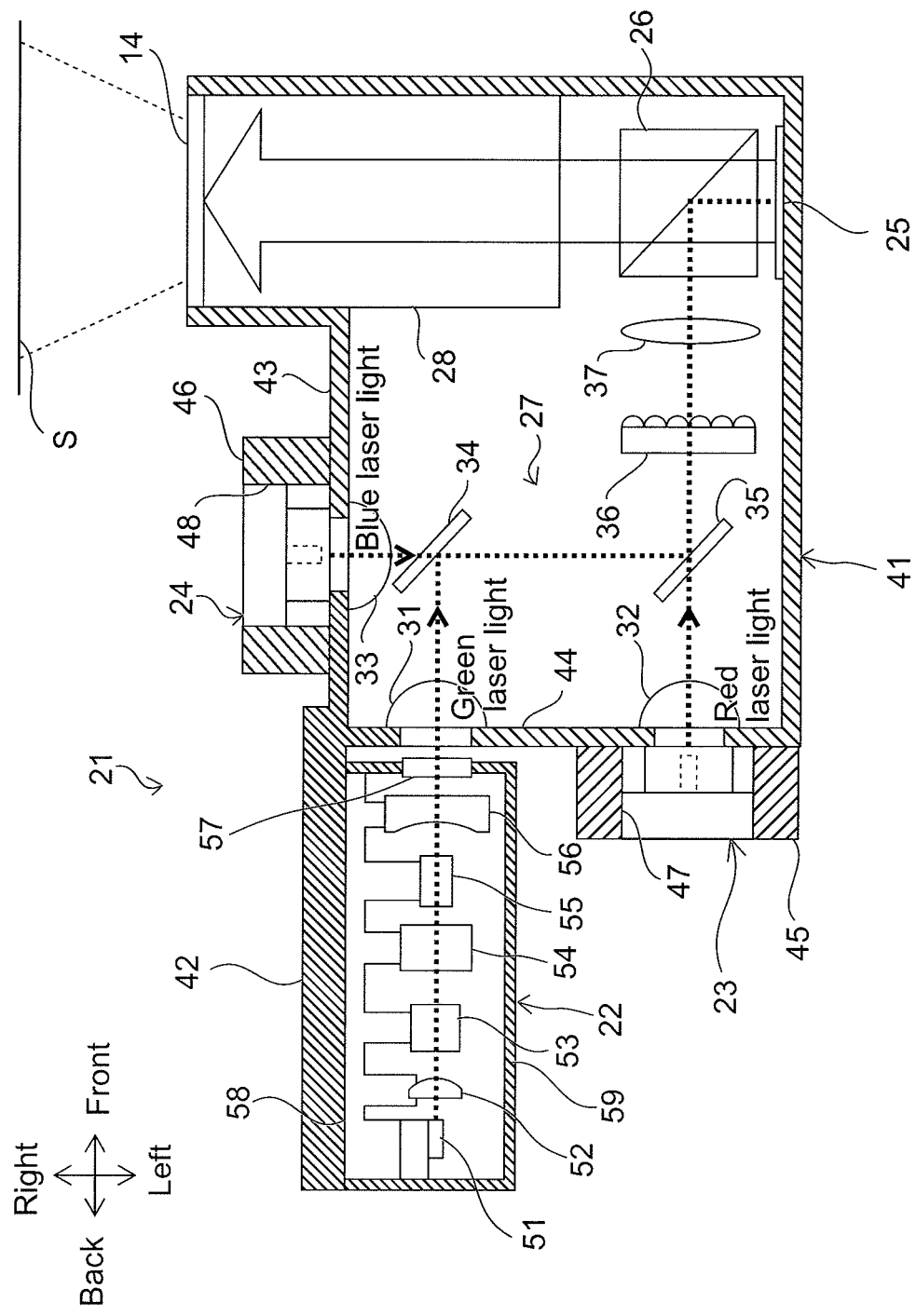
FIG. 3 is a schematic view of the structure of an optical engine 21 installed in an optical engine unit 11.
Figure 4:
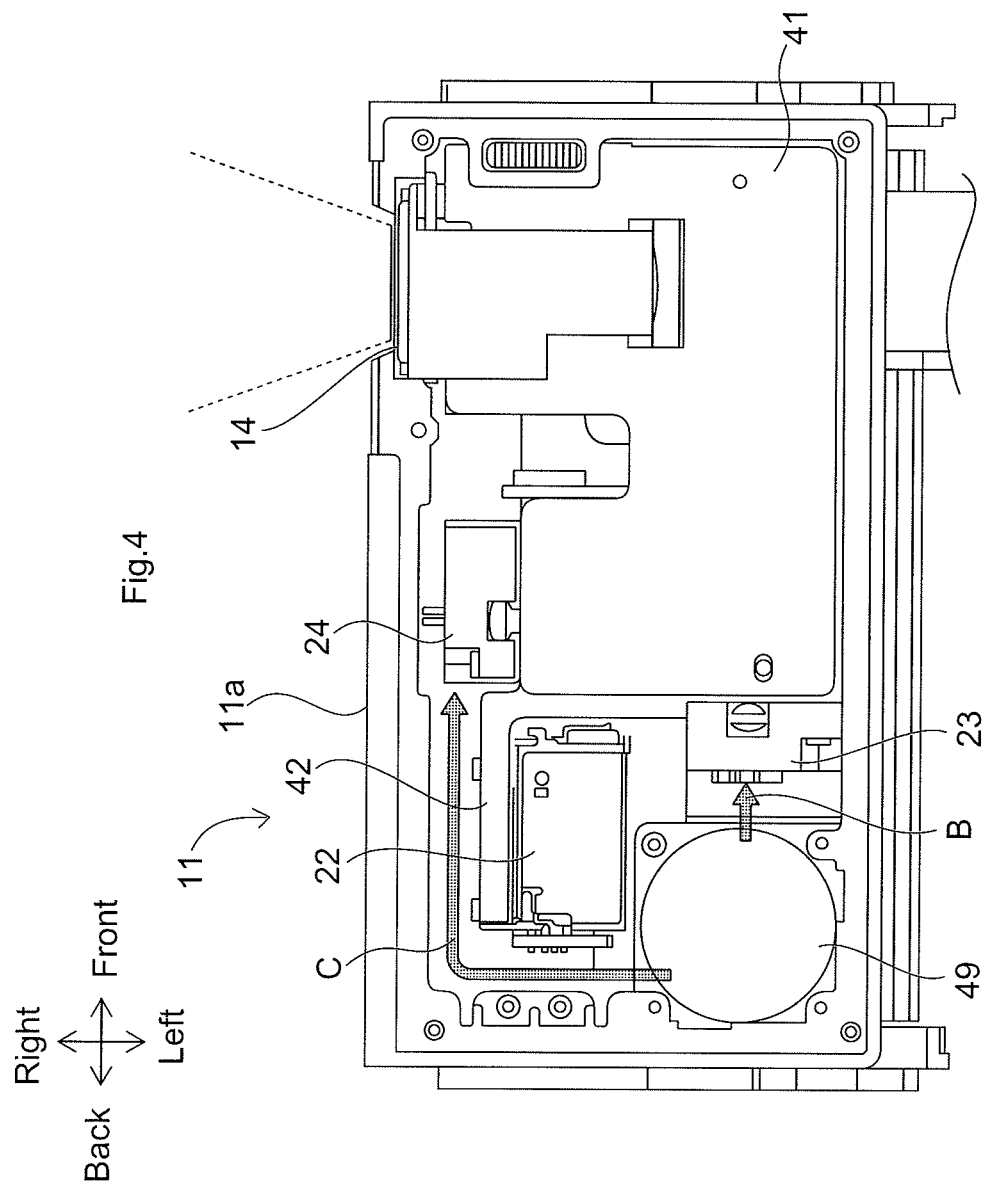
FIG. 4 is a plan view illustrating the interior of a housing 11a of the optical engine unit 11.

FIG. 3 is a schematic view of the structure of an optical engine 21 installed in the optical engine unit 11. FIG. 4 is a planar view illustrating the interior of a housing 11a of the optical engine unit 11.

As shown in FIG. 3, the optical engine 21 enlarges and displays by projection a desired image on an exterior screen S. The optical engine 21 includes a green color laser light source apparatus 22 which outputs green color laser light, a red color laser light source apparatus 23 which outputs red color laser light, and a blue color laser light source apparatus 24 which outputs blue color laser light. The optical engine 21 further includes a liquid crystal reflective spatial light modulator 25, a polarizing beam splitter 26, a relay optical system 27, and a projection optical system 28. The liquid crystal reflective spatial light modulator 25 forms an image by spatially modulating laser light from each of laser light source apparatuses 22 through 24 according to image signals. The polarizing beam splitter 26 reflects laser light from each of laser light source apparatuses 22 through 24 to shine the light onto the spatial light modulator 25. In addition, modulated laser light emitted from the spatial light modulator 25 is allowed to pass through the polarizing beam splitter 26. The relay optical system 27 guides laser light emitted from each of laser light source apparatuses 22 through 24 to the polarizing beam splitter 26. The projection optical system 28 contains a projection lens which projects onto the screen S the modulated laser light which has passed through the polarizing beam splitter 26.

The image display apparatus 1 displays a color image with a field sequential system (time-sharing display system). Laser light of each color from each of laser light source apparatuses 22 through 24 is sequentially output with time-sharing and is recognized as a color image due to the after-image of the image produced by the laser light of each color.

The relay optical system 27 includes collimator lenses 31 through 33, first and second dichroic mirrors 34 and 35, a diffuser plate 36, and a field lens 37. The collimator lenses 31 through 33 convert the laser light of each color from each of laser light source apparatuses 22 through 24 into parallel beams. The first and second dichroic mirrors 34 and 35 guide in a desired direction the laser light of each color which has passed through the collimator lenses 31 through 33. The diffuser plate 36 diffuses the laser light guided by the dichroic mirrors 34 and 35. The field lens 37 converts the laser light which has passed through the diffuser plate 36 into a convergent laser.

Where the right side is the side to which the laser light is emitted from the projection optical system 28 toward the screen S, the blue color laser light from the blue color laser light source apparatus 24 is emitted to the left. Green color laser light and red color laser light are emitted from the green color laser light source apparatus 22 and the red color laser light source apparatus 23, respectively, such that the optical axis of the green color laser light and the optical axis of the red color laser light are mutually orthogonal with respect to the optical axis of the blue color laser light. The blue, red, and green color laser lights are guided onto the same light path by the two dichroic mirrors 34 and 35. Specifically, the blue color laser light and green color laser light are guided onto the same light path by the first dichroic mirror 34 while the blue, green, and red color laser lights are guided onto the same light path by the second dichroic mirror 35.

The first dichroic mirror 34 and the second dichroic mirror 35 have a film formed on their surfaces so as to transmit or reflect laser light of a desired wavelength. The first dichroic mirror 34 transmits blue color laser light and reflects green color laser light. The second dichroic mirror 35 transmits red color laser light and reflects blue color laser light and green color laser light.

The green color laser light source apparatus 22 is attached to an attachment plate 42 formed in an internal casing 41 such that it protrudes laterally. The attachment plate 42 protrudes from a corner where a right wall 43 and a back wall 44 intersect in a direction orthogonal to the back wall 44 so as to extend the right wall 43, the right wall 43 and the back wall 44 positioned to the right and to the back, respectively, of a housing space in the relay optical system 27. With this structure, the attachment plate 42 acts as a heat sink and promotes heat release from the green color laser light source apparatus 22. In addition, that heat is not easily transmitted to the internal casing 41 and the effects of heat on the other laser light source apparatuses may be inhibited. The red color laser light source apparatus 23 is attached to the exterior surface of the back wall 44, supported by a holder 45. The blue color laser light source apparatus 24 is attached to the exterior surface of the right wall 43, supported by a holder 46.

The red color laser light source apparatus 23 and the blue color laser light source apparatus 24 are composed of a CAN package. A laser chip which outputs laser light is provided such that an optical axis is supported by a stem, positioned above the central axis of a can-shaped exterior. Laser light is emitted from a glass window provided in an opening on the exterior. The red color laser light source apparatus 23 and the blue color laser light source apparatus 24 are, for example, pressed into attachment holes 47 and 48 on holders 45 and 46, respectively, and are thereby fixed to holders 45 and 46. The laser chips in the blue color laser light source apparatus 24 and the red color laser light source apparatus 23 produce heat, which is conducted to the interior casing 41 via the holders 45 and 46, respectively, to be released. The holders 45 and 46 are formed from materials with high heat conductibility, such as aluminum, copper, or the like.

Red color laser light has a wavelength of 640 nm, but any wavelength that is recognizable as having a red color is acceptable. For example, light having a wavelength range with a peak wavelength between 610 and 750 nm may be used. Blue color laser light has a wavelength of 450 nm, but any wavelength that is recognizable as having a blue color is acceptable. For example, light having a wavelength range with a peak wavelength between 435 and 480 nm may be used.

The green color laser light source apparatus 22 includes a semiconductor laser 51 which outputs excitation laser light; a FAC (Fast-Axis Collimator) lens 52 and a rod lens 53, which are collection lenses collecting the excitation laser light output from the semiconductor laser 51; a solid-state laser element 54, which is excited by the excitation laser light and outputs fundamental laser light (infrared laser light); a wavelength conversion element 55, which converts the wavelength of the fundamental laser light and outputs half-wavelength laser light (green color laser light); a concave mirror 56, which forms a resonator with the solid-state laser element 54; a glass cover 57, which blocks leakage of excitation laser light and fundamental wavelength laser light; a base 58, which supports each portion; and a cover 59, which overlays them.

The laser chip of the semiconductor laser 51 outputs excitation laser light having a wavelength of 808 nm. The FAC lens 52 reduces the spread of a fast axis of laser light (a direction orthogonal with respect to an optical axis direction and which follows the plane of the figure). The rod lens 53 reduces the spread of a slow axis of laser light (a direction orthogonal with respect to the plane of the figure).

The solid-state laser element 54 is a solid-state laser crystal. The solid-state laser element 54 is excited by excitation laser light having a wavelength of 808 nm which has passed through the rod lens 53. The solid-state laser element 54 then outputs fundamental wavelength laser light (infrared laser light) having a wavelength of 1064 nm. The solid-state laser element 54 is made by doping an inorganic optically active material (a crystal) composed of $YVO_4$ (yttrium vanadate) with Nd (neodymium) and, more specifically, is made by doping the Y of the parent material $YVO_4$ by substituting $Nd^{+3}$, the $Nd^{+3}$ being a fluorescing element.

The wavelength conversion element 55 is an SHG (Second Harmonics Generation) element. The wavelength conversion element 55 converts the wavelength of a fundamental wavelength laser light (infrared laser light) having a wavelength of 1064 nm output from the solid-state laser element 54 and creates half-wavelength laser light (green color laser light) having a wavelength of 532 nm.

In the wavelength conversion element 55, a portion of the fundamental wavelength laser light having a wavelength of 1064 nm which has been incident from the solid-state laser element 54 is converted to half-wavelength laser light having a wavelength of 532 nm. The fundamental wavelength laser light having a wavelength of 1064 nm which has passed through the wavelength conversion element 55 without being converted is reflected by the concave mirror 56 and is once again incident on the wavelength conversion element 55. The unconverted fundamental wavelength laser light is then converted to half-wavelength laser light having a wavelength of 532 nm. The half-wavelength laser light having a wavelength of 532 nm is reflected by the wavelength conversion element 55 and emitted therefrom. The laser light outputted from the green color laser light source apparatus 22 may be any wavelength that can ultimately be recognized as having a green color. For example, anything outputting laser light having a wavelength range with a peak wavelength between 500 and 560 nm is acceptable.

In order to block leakage to the exterior of excitation laser light having a wavelength of 808 nm and fundamental wavelength laser light having a wavelength of 1064 nm, the glass cover 57 is provided with a film through which these laser lights do not pass.

The base 58 is attached to the attachment plate 42 of the interior casing 41, and the green color laser light source apparatus 22 is thereby fixed in place. A space of a desired width (for example, equal to or less than 0.5 mm) is formed between the green color laser light source apparatus 22 and the back wall 44 of the interior casing 41. The heat from the green color laser light source apparatus 22 is therefore not easily transmitted to the red color laser light source apparatus 23. A rise in temperature in the red color laser light source apparatus 23 can thus be inhibited and the red color laser light source apparatus 23 can be operated steadily despite its unfavorable temperature characteristics. Further, in order to preserve a desired margin for optical axis adjustment (for example, approximately 0.3 mm) of the red color laser light source apparatus 23, a space of a desired width (for example, equal to or greater than 0.3 mm) is provided between the green color laser light source apparatus 22 and the red color laser light source apparatus 23.

In addition to the green color laser light source apparatus 22 described above, the interior casing 41 supports each of the structural elements of the optical engine 21 (the spatial light modulator 25, the polarizing beam splitter 26, the relay optical system 27, the projection optical system 28, and the like).

The interior casing 41 acts as a heat sink releasing the heat produced by each of the laser light source apparatuses 22 through 24, and is formed of a material with high heat conductibility such as aluminum, copper, or the like.

As shown in FIG. 4, the interior casing 41 is accommodated within the housing 11a of the optical engine unit 11. A cooling fan 49 is provided within the housing 11a to cool the laser light source apparatuses of each color 22 through 24. An intake vent 61 (see FIG. 9) is provided directly below the cooling fan 49. When the cooling fan 49 is active, outside air is taken in from the intake vent 61 and, after circulating within the housing 11a as shown by arrows B and C in FIG. 4, the intaken air is ejected to the exterior from an exhaust vent 62 (see FIG. 9).

Further, as shown in FIG. 3, the interior casing 41 is provided with a right wall 43 on which the projection window 14 of the projection optical system 28 is positioned, the front end of the right wall 43 protruding to the right. As shown in FIG. 4, the projection window 14 is exposed to the exterior from an opening provided on the housing 11a of the optical engine unit 11.

Figure 6:
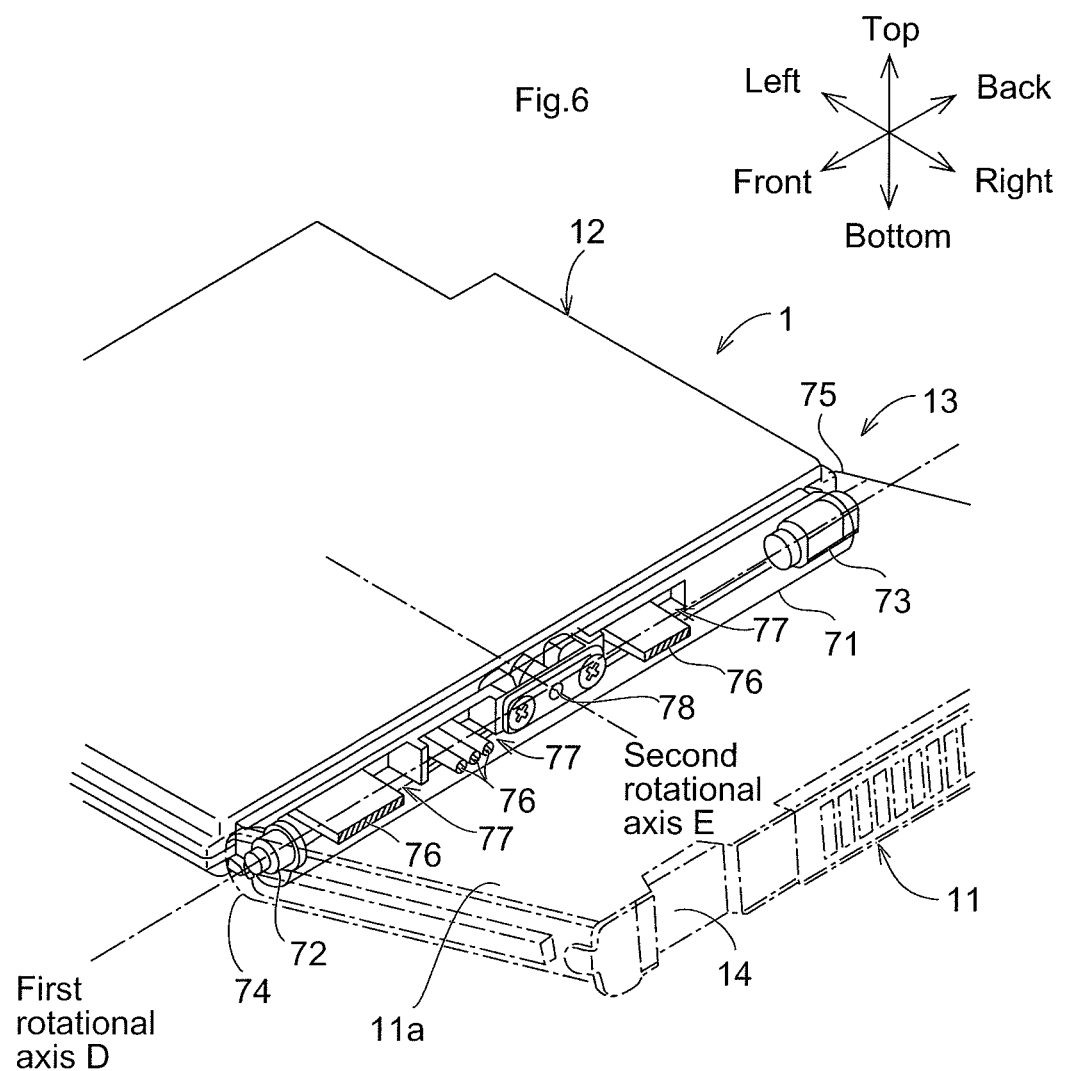
FIG. 6 is a perspective view illustrating a hinge 13 in the image display apparatus 1 in detail.

FIG. 5 is a partial perspective view illustrating a periphery of the image display apparatus 1 in the information processing apparatus 2. FIG. 6 is a perspective view illustrating the hinge 13 in the image display apparatus 1 in detail. FIG. 7 is an explanatory view of the structure regulating the range of rotation of a pop-up base 81. FIG. 8 is a schematic planar view illustrating a locking structure of the pop-up base 81 with a switch 15. FIG. 9 is a perspective view illustrating an exemplary manual tilt adjustment of the optical engine unit 11.

When the image display apparatus 1 is to be used, the user must rotate the optical engine unit 11 which is in a previously presented stored position (the first position) shown in FIG. 1A into a start-use position (the second position) shown in FIG. 1B and FIG. 5 with the hinge 13 (see FIG. 6) as an axis.

As shown in FIG. 6, in the hinge 13, a pair of first pivots 72 and 73 centered on a first rotational axis D are connected to both longitudinal ends of a connector 71 extending in a front-back direction of the optical engine unit 11. The pair of first pivots 72 and 73 are connected to a pair of attachments 74 and 75 provided on the casing of the optical engine unit 11, thereby rotatably supporting the housing 11a of the optical engine unit 11 around the first rotational axis D. A second pivot 78 centered on a second rotational axis E is connected to the longitudinal center of the connector 71.

The first rotational axis D is disposed in a front-back direction which is the display direction of the LCD 7 (see FIGS. 1A and 1B). The first rotational axis D has an orientation which is orthogonal with respect to the optical axis of the laser light projected from the projection window 14. The projection direction of the projection window 14 is oriented in a direction different from the display direction of the LCD 7 (i.e., the direction of the user operating the information processing apparatus 2). Operability and safety for the user are thus improved. By rotating the optical engine unit 11 around the first rotational axis D, the user is able to tilt-adjust up or down the angle of the laser light projected from the projection window 14. The image displayed on the screen shifts up or down accordingly. Thus it is possible to display an image appropriately in a desired screen position without the image on the screen being missing or tilted.

The second rotational axis E is disposed in a direction orthogonal with respect to the first rotational axis D. By rotating the optical engine unit 11 around the second rotational axis, the tilt of an image may be corrected by turning the image displayed on the screen. By adjusting the first rotational axis D such that it is horizontal, an image may be obtained having no tilt. Further, once the first rotational axis D has been adjusted to be horizontal, by rotating the optical engine unit 11 around the first rotational axis D, the angle of the laser light projected from the projection window 14 may be adjusted up or down. The image displayed on the screen shifts up or down accordingly.

The connector 71 includes a plurality of openings 77 into which wiring cables 76 have been inserted, the wiring cables 76 being signal wires and power supply wires. The wiring cables 76 are drawn to the right from the control unit 12 and are fed into the optical engine unit 11. The wiring cables 76 are composed of a flexible printed circuit (FPC) board or a lead wire (for example, plastic-coated wire).

The image display apparatus 1 includes a rotation aid structure which aids the rotation of the optical engine unit 11 from a stored position to a start-use position (that is, which non-manually rotates the optical engine unit 11).

As shown in FIG. 5, the rotation aid structure has a pop-up base (rotation aid) 81 which assists the rotating motion of the optical engine unit 11. The pop-up base 81 is composed of a bottom panel 82, a back panel 83, and a front panel 84. The bottom panel 82 supports the bottom face of the optical engine unit 11. The back panel 83 continues from the back edge of the bottom panel 82 and opposes the back face of the optical engine unit 11. The front panel 84 continues from the front edge of the bottom panel 82 and opposes the front face of the optical engine unit 11. The top of the right edge of the bottom panel 82 is left open so there is no obstruction of the projection of laser light from the projection window 14 or of exhaust from the exhaust vent 62.

A rotation pivot 85 which protrudes forward is provided on the upper side of the left end side of the front panel 84. The rotation pivot 85 is rotatably supported by a pivot support (not shown in the figures) which is provided on the information processing apparatus 2 side. Further, although omitted from the figures, a rotation pivot having the same structure as the rotation pivot 85 is provided such that it protrudes to the back on the upper side of the left end side of the back panel 83 on the same axis as the rotation pivot 85.

As shown in FIG. 7, a torsion coil spring (bias) 91 is attached to the rotation pivot 85. In the torsion coil spring 91, one arm is fixed to the front panel 84 of the pop-up base 81, while the other arm is fixed to the information processing apparatus side. Accordingly, the pop-up base 81 (optical engine unit 11) is constantly pressed against the start-use position side (the position shown by a solid line in FIG. 7) by the bias force of the torsion coil spring 91.

The locking projection 84*a* which is provided on the front panel 84 and projects forward therefrom. When the optical engine unit 11 is in the stored position, as shown in FIG. 8, the locking projection 84*a* is locked to the lock 15*a* of the switch 15 (contacts the bottom of the lock 15*a*), thereby regulating the rotation of the pop-up base 81. When the image display apparatus 1 is to be used, the user may release the lock of the locking projection 84*a* due to the lock 15*a* projecting to the back (i.e., the overlap of the lock 15*a* and the locking projection 84*a*) by sliding the switch 15 to the right. The optical engine unit 11 thereby rotates to the start-use position side (at least to a position where projection window 14 is exposed) along with the pop-up base 81 due to the bias force of the torsion coil spring 91.

As shown in FIG. 7, a rotation regulation hole 92 configuring a long, arced hole is formed on the front panel 84. A rotation regulation pin (rotation regulator) 93 which projects toward the back from the front in the housing concavity 5 is inserted into the rotation regulation hole 92. The optical engine unit 11 in the stored position (the position shown by the two-dot-dashed line in FIG. 7) is rotated along with the pop-up base 81 to the start-use position. The bottom edge of the rotation regulation hole 92 located on the pop-up base 81 then contacts the rotation regulation pin 93 and regulates the rotation of the pop-up base 81. Specifically, the rotation range of the pop-up base 81 is between the stored position where the rotation regulation pin 93 contacts the top edge of the rotation regulation hole 92 and the start-use position where the rotation regulation pin 93 contacts the bottom edge of the rotation regulation hole 92.

This structure allows the pop-up base 81 to rotate as a single body with the optical engine unit 11 between the stored position and the start-use position. The optical engine unit 11 can be easily popped up in the image display apparatus 1 by operating the switch 15. Therefore, there is no need for the user to directly extract the optical engine unit 11 from the housing concavity 5 by hand. Further, through the rotation of the optical engine unit 11, the intake vent 61 and the exhaust vent 62 go from a shut state to a free state in the housing concavity 5.

The optical engine unit 11 is rotatable independent of the pop-up base 81. As shown in FIG. 9, the optical engine unit 11 is further rotatable from the start-use position to an upright position which is roughly perpendicular to the control unit 12, exceeding the rotation range of the pop-up base 81 (that is, separating the optical engine unit 11 from the pop-up base 81) through manual operation by the user. Here, the right end sides of the top end edges of the back panel 83 and the front panel 84 are inclined downwards (that is, forming a tapered shape). Accordingly, as shown in FIG. 5, the right end of the optical engine unit 11 is exposed and becomes easier for the user to grip during manual operation. The user adjusts the projection angle of laser light from projection window 14 by rotating the optical engine unit 11 between the start-use position and the upright position, and is thus able to appropriately project the laser light onto the screen S.

In addition, as shown in FIG. 5, the operator 6 provided on the top surface 4*a* of the palm rest 4 includes a power operation button 95, an operation button 96 to change brightness, and two trapezoidal correction operation buttons 97 and 98. The user may shift a projected image up or down by rotation of the optical engine unit 11 and may perform trapezoidal correction on the resulting image.

In the information processing apparatus 2 described above, when the image display apparatus 1 is not in use, the projection window 14 is shielded by storing the optical engine unit 11 within the casing. In addition, when the image display apparatus 1 is in use, the projection window 14 may be exposed in a preferred projection direction by rotation of the optical engine unit 11. Accordingly, the image display apparatus 1 has a structure which allows compact installation in the mobile information processing apparatus 2 and the level of convenience is increased. In particular, because the optical engine unit 11 is provided extractably and retractably from the palm rest 4 in which housing space is easily reserved, the image display apparatus 1 has a structure which allows compact installation and allows easy modification of the projection direction of laser light onto a screen.

The present invention has been described based on specific embodiments, however these embodiments are merely examples and the present invention is not limited to these embodiments. In addition, the image display apparatus and the mobile information processing apparatus equipped with the same according to the present invention as illustrated in the embodiments described above have various structural elements which are not strictly necessary in their entirety and which may be selected as appropriate so long as they do not deviate from the scope of the present invention.

For example, a known drive bay such as a shell drive may be used as the housing space for the image display apparatus provided in the palm rest of the information processing apparatus. Should a detailed description of a drive bay of this type be required, please refer to Japanese Patent Laid-open Publication No. 2004-326499, for example.

In addition, the pop-up base (rotation aid) may be eliminated, for example, and a structure may be used which directly biases the hinge between the optical engine unit and the control unit with a spring or the like in the rotation direction of the optical engine unit. In such a case, the switch (lock) locking the pop-up base may have a structure in which the optical engine unit is directly locked. The element biasing the optical engine unit is not limited to the torsion coil spring; a known element such as a flat spring or the like may be used. Furthermore, the start-use position (second position) of the optical engine unit is not limited to the position shown in FIG. 5. Any desired position may be set so long as the projection window is exposed.

The image display apparatus and the mobile information processing apparatus equipped with the same according to the present invention offer a structure allowing compact installation of the image display apparatus in the mobile information processing apparatus. The level of convenience is increased, as well. The image display apparatus and the mobile information processing apparatus equipped with the same according to the present invention are useful as the image display apparatus employing a semiconductor laser as a light source and the mobile information processing apparatus equipped with the same.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An image display apparatus installed in a mobile information processing apparatus and projecting laser light emitted from a light source onto an exterior screen, comprising:
   a first unit provided with a projection window guiding the laser light to the exterior;
   a second unit rotatably supporting the first unit;
   a bias biasing the first unit; and
   a rotation aid,
   wherein the first unit is rotatable between a first position and a second position, the projection window being shielded within a casing of the mobile information processing apparatus in the first position and the projection window being exposed outside the casing of the mobile information processing apparatus in the second position,
   wherein the rotation aid is rotatable as a single body with the first unit only when the first unit is between the first position and the second position,
   wherein the bias biases the first unit toward the second position side through the rotation aid, and
   wherein, after the first unit has rotated toward the second position side as a single body with the rotation aid through the bias force of the bias, the first unit may be separated from the rotation aid and further rotated in the same direction.

2. A mobile information processing apparatus which includes the image display apparatus according to claim 1.

3. The mobile information processing apparatus according to claim 2, comprising:
   an operation inputter; and
   a palm rest adjacent thereto, wherein
   the first unit is provided extractably and retractably in the palm rest.

4. The mobile information processing apparatus according to claim 3,
   wherein the first unit and the second unit are housed in a drive bay provided in the palm rest.

5. The mobile information processing apparatus according to claim 3,
   wherein the first unit forms a part of a rest surface of the palm rest.

6. The mobile information processing apparatus according to claim 2, further comprising:
   a display for information display,
   wherein, when the first unit is in the second position, the projection direction of the projection window is turned in a direction different from the display direction of the display.

* * * * *